A. B. HERRICK.
CALCULATING APPARATUS.
APPLICATION FILED MAY 7, 1908.
1,087,445.
Patented Feb. 17, 1914.
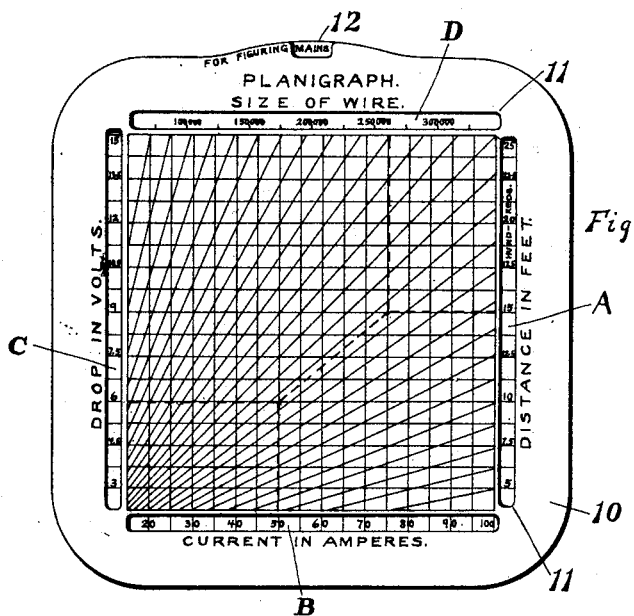
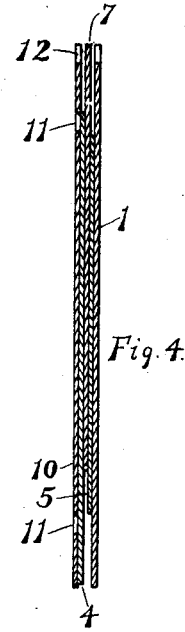
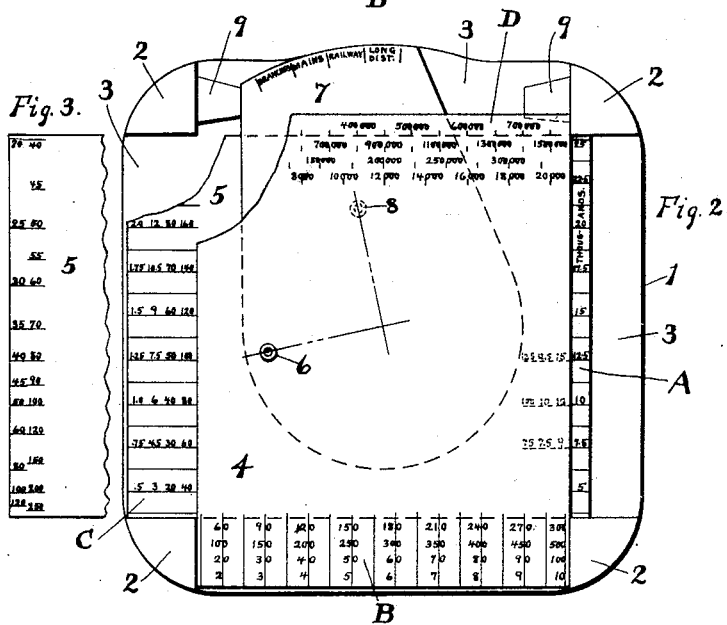
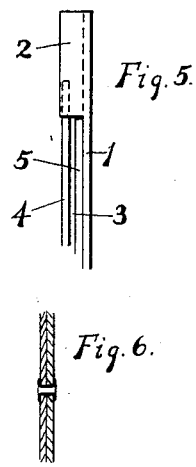
WITNESSES:
Edmund O. Dubocq.
Geo. N. Kerr.
INVENTOR.
Albert B. Herrick
BY Edwards, Sager & Wooster.
ATTORNEYS

UNITED STATES PATENT OFFICE.

ALBERT B. HERRICK, OF RIDGEWOOD, NEW JERSEY.

CALCULATING APPARATUS.

1,087,445.

Specification of Letters Patent. Patented Feb. 17, 1914.

Application filed May 7, 1908. Serial No. 431,350.

*To all whom it may concern:*

Be it known that I, ALBERT B. HERRICK, a citizen of the United States, residing at Ridgewood, in the county of Essex and State of New Jersey, have invented certain new and useful Improvements in Calculating Apparatus, of which the following is a full, clear, and exact specification.

This invention relates to calculating apparatus, and has particular reference to an apparatus adapted for the graphical solution of typical equations wherein one quantity is unknown and three or more are known. A convenient means for the graphic solution of such equations, without the necessity of calculation, is desirable, especially in engineering problems, such as horse-power calculations, wiring, property of beams, fills, etc. Such equations have the general form $$\frac{A \times B}{C} = D,$$

and it is the object of this invention to provide an apparatus wherein these equations can be graphically solved, three of the factors being known. The presence of one or more constants in the equation does not affect the result when they are fixed for the whole equation. By the same apparatus, equations of the general form $$A \times B \times C = D$$

may be solved by using the reciprocal of one or more of the factors.

In carrying out the invention, the four sides of a rectangle are each divided into scales, each representing one of the factors of the equation, and the rectangle is itself divided by lines radiating from a center, either within the chart or outside of it as the special problem requires. By causing these scales and radial lines to bear a functional relation to the equation to be solved, it is possible to solve a great variety of equations, varying according to the scales employed.

In solving different kinds of problems, as horse-power and wiring, for instance, different scales are necessary, and in order to increase the range of usefulness of the apparatus, I have provided a calculating apparatus embodying a plurality of scales, and preferably so interconnected that scales suitable for one range of problems may be simultaneously shifted to scales suitable for the other range of problems.

The invention will be more fully understood in connection with the description of the accompanying drawings, wherein—

Figure 1 is a view of an apparatus embodying the invention; Fig. 2 is a view with the face plate removed, showing the movable scale plates; Fig. 3 shows a scale arranged according to reciprocals; Fig. 4 is a cross section; Fig. 5 is a detail end view; and Fig. 6 is a detail showing the connection of movable scale plates.

1 represents the base plate having raised corners 2, forming guideways or spaces 3 in which slide scale plates 4, 5. The scale plate 4 slides vertically, and the scale plate 5 transversely between the corners 2. In order to operate the scale plates simultaneously, there is pivoted at 6 to plates 4, an operating lever 7, which is pivoted to plate 5 at 8, the lever 7 lying between the plates 4, 5, so that when the lever is moved between the stops 9, 9 on base plate 1, the plate 4 will be moved vertically, and the plate 5 simultaneously horizontally. As will be seen in Fig. 2, the plate 4 has four scales B at one end and four scales D at the other end, and the plate 5 has four scales A at one end, and four scales C at the other end, whereby four different kinds of problems can be solved by shifting the operating lever 7 to four different positions, and thereby bringing the corresponding scales, having functional relation with each other, into proper positions. As many different sets of scales may be used as there are ranges of the problem which it is desired to work out with a single device, the scales for each range of problems bearing a functional relation to each other, as in Fig. 1 where scale A represents distance in feet, B current in amperes, C drop in volts, and D size of wire.

Referring now to Fig. 1, showing the complete apparatus, the face plate 10 has slots 11 through which the scales A, B, C, D, appear, when they are properly set by the lever 7 and the indicating notch 12. The rectangle formed by the four slots is laid out into squares proportioned to indicate units of measure. Near one of the corners of the rectangle is the center from which radii are drawn to the division marks. The zero of scales B and C is at this center, while zero on scales A and D are on the ordinate and abscissa from this same center. It will be understood that the values for three of the scales can be laid out for the range of the problems required but related to each other as the formulæ connecting them, and values of the fourth scale figured out from the other three. As herein shown, the values of scale D have been calculated and plotted from the values assumed for scales A, B, C and this will be done for each kind of problem where different scales having different values are required. It will be understood that values having been taken for any three of the scales, the fourth must be calculated and plotted therefrom, in order to solve all problems within the range of a given set of scales.

The scales A, B, C, D, of Fig. 1, are marked respectively for distance in feet for a main, current in amperes, drop in volts, and size of wire in circular mils, and with such scales and the diagonal lines, it is possible to make calculations graphically to determine any one of these quantities, if the other three be known. Thus suppose it be desired to ascertain the size of wire necessary to carry a current of 50 amperes for 1500 feet, with a drop of say six volts. The current in amperes multiplied by twice the distance in feet, multiplied by a constant for the resistance per mil foot and divided by the drop in volts equals the circular area of the necessary wire, which can be read off from the scale D. To do this, find the diagonal passing through the point where the horizontal line from the division 6 of scale C meets the vertical line from division 50 of scale B, then go up or down on this diagonal until the horizontal line from the division 15 of scale A is crossed, and a vertical line upward from this last intersection will intersect scale D at about the division 260,000, which is the solution. It should be borne in mind that the two multipliers $(A \times B)$ must be on the same side of the diagonal, and the divider (C) on the opposite side, the fourth quantity which is read off being on the side with the divisor. Thus C can be ascertained if A B D be known by taking A and B as multipliers, and dividing by D. In operating this apparatus, it is essential to select two of the three known values lying on opposite sides of the diagonal, as B and C, or A and D as multipliers. Those values lying on the same side of the diagonal, as A and B, or C and D, will not correctly solve problems, if used as multipliers. If now it be desired to solve problems wherein three quantities must be multiplied together, the same scales do not suffice, for this apparatus requires that one of the factors be a divisor. To multiply three quantities together is the same as dividing the product of two of them by the reciprocal of the third, so that by laying out one of the scales according to reciprocals, as for instance in Fig. 3, equations of the form $$A \times B \times C = D$$

assume the form $$\frac{A \times B}{C} = D,$$

thereby enabling this invention to be used for a wider variety of problems, such for instance as in calculating the horse-power of an engine, where the stroke, mean effective pressure, speed, and piston area are involved, three of which are known. The presence of one or more constants in the equation does not affect the invention where they are the same for the whole equation.

It will be seen that where movable scale plates are provided, each having a plurality of scales, a large number of problems can be solved by a single apparatus, the scales being predetermined to have the proper functional relations to each other. It will also be observed that the center from which the diagonal lines are drawn is not shown, this being because the values outside the rectangle are not necessary for the solution of such problems as ordinarily arise. By retaining only such values as are necessary, the device can be made much smaller than would otherwise be the case, and is thereby more convenient to be carried about by engineers and those having occasion to use the invention. While both scales may be moved independently, it is advantageous to arrange the scales and to connect them so that both can be simultaneously moved to the correct position.

From the foregoing description, it is thought that the nature and advantages of the invention will be fully understood, and also the manner of operating the same to solve problems graphically.

Having thus described my invention, I declare that what I claim as new and desire to secure by Letters Patent, is:

1. A calculating apparatus comprising a plate having intersecting lines thereon, a plurality of members each having corresponding sets of scales indicated thereon, the divisions of each of said scales corresponding to said lines, said plate being cut away to permit corresponding scales on said members to be visible at a time, and means for moving said members with respect to said plate to bring to view a different set of scales.

2. A calculating apparatus comprising a plate provided with slots at two of its sides and a pair of slides having sets of scales mounted to move in directions at right angles to said two sides of said plate to bring different sets of scales into alignment with said slots.

3. A calculating apparatus comprising a plate provided with slots at two of its sides, and a pair of slides having sets of scales mounted to move in directions at right angles to said two sides of said plate to bring different sets of scales into alinement with said slots, and means for moving said scales simultaneously.

4. A calculating apparatus comprising a plate having a rectangle marked thereon, a plurality of movable scale plates for each side of said rectangle, an operating lever connected to both scale plates whereby to move them simultaneously at right angles to each other, and a plurality of sets of scales on each scale plate, the scales of each set bearing a functional relation to each other.

5. A calculating apparatus comprising a plate having a rectangle marked thereon, a plurality of movable scale plates for each side of said rectangle, an operating lever connected to both scale plates whereby to move them simultaneously at right angles to each other, a plurality of sets of scales on each scale plate, the scales of each set bearing a functional relation to each other, said operating lever having an indication corresponding to each set of scales, and indicating means on the plate.

6. A calculating apparatus, comprising a plate having cross-section lines and diagonal lines, at least three sides of said plate being provided with slots, a slide mounted at each of said sides of said plate, said slides carrying a plurality of corresponding sets of scales representing at least three different quantities bearing a functional relation to each other, and means for simultaneously moving said slides to bring corresponding sets of scales into view.

7. The combination of a face plate of four sides and having cross-section lines and diagonal lines, the four sides of said face plate being provided with slots, a plurality of plates carrying a plurality of corresponding series of designations, and means for simultaneously moving said plates relative to the face plate so that corresponding series of designations on said plates can be read through said slots.

8. A calculating apparatus comprising a plate having intersecting lines thereon, a plurality of members each having corresponding sets of scales indicated thereon, the divisions of each of said scales corresponding to said lines, said plate being cut away to permit corresponding scales on said members to be visible at a time, a common means for shifting said members to bring to view a different set of scales, and means for indicating the nature of the set of scales brought to view.

In testimony whereof I affix my signature, in presence of two witnesses.

ALBERT B. HERRICK.

Witnesses:
JULIAN S. WOOSTER,
GEO. A. HOFFMAN.